(12) United States Patent
Chen et al.

(10) Patent No.: US 6,433,911 B1
(45) Date of Patent: Aug. 13, 2002

(54) FRUSTRATED TOTAL INTERNAL REFLECTION-BASED MICRO-OPTO-ELECTRO-MECHANICAL MODULATOR/DEMODULATOR

(75) Inventors: Dye-Zone A. Chen, Cambridge; George Barbastathis, Boston, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/574,267

(22) Filed: May 19, 2000

(51) Int. Cl.⁷ .............................. G02B 26/08; G02B 6/34
(52) U.S. Cl. ...................... 359/222; 359/261; 359/276; 359/279; 359/298; 359/566; 359/572; 385/10; 385/14; 385/30; 385/37
(58) Field of Search ................................. 359/117, 128, 359/130, 179, 222–247, 252, 254, 261–263, 276–279, 291–298, 299, 300–304, 317, 320, 566–572, 589, 615, 639, 834; 385/10, 14, 18, 22, 37, 42, 133, 30, 7, 8

(56) References Cited

U.S. PATENT DOCUMENTS

| | | | | |
|---|---|---|---|---|
| 3,559,101 A | * | 1/1971 | Parker et al. ................. | 359/222 |
| 3,872,451 A | * | 3/1975 | McNaney .................... | 359/222 |
| 3,905,676 A | * | 9/1975 | Ulrich ........................... | 385/8 |
| 3,951,513 A | * | 4/1976 | Masi ............................. | 385/8 |
| 4,106,848 A | * | 8/1978 | Conwell et al. .............. | 385/37 |
| 4,113,360 A | * | 9/1978 | Baur et al. ................... | 359/222 |
| 5,221,897 A | * | 6/1993 | Laughlin ...................... | 359/222 |
| 5,319,491 A | * | 6/1994 | Selbrede ...................... | 359/291 |
| 5,771,321 A | | 6/1998 | Stern ............................ | 385/31 |
| 5,841,916 A | | 11/1998 | Laughlin ...................... | 385/16 |
| 5,870,221 A | | 2/1999 | Goossen ...................... | 359/291 |
| 5,875,271 A | * | 2/1999 | Laughlin ...................... | 359/222 |
| 5,953,469 A | * | 9/1999 | Zhou ............................ | 385/22 |
| 5,966,234 A | * | 10/1999 | Ford et al. .................... | 359/248 |
| 5,999,307 A | * | 12/1999 | Whitehead et al. .......... | 359/298 |
| 6,028,978 A | * | 2/2000 | Takeuchi et al. ............. | 359/222 |
| 6,192,168 B1 | * | 2/2001 | Fledstein et al. .............. | 385/12 |
| 6,236,778 B1 | | 5/2001 | Laughlin ...................... | 385/24 |

OTHER PUBLICATIONS

"Large–Area Micromechanical Flat–Panel Display" by Ernest Stern, Conference Record of the 1997 International Display Research Conference and International Workshops on LCD Technology and Emissive Technology. Soc. Inf. Display, 1997, pp. 230–233.

"Losses in polycrystalline silicon waveguides" by J.S. Foresi et al., Appl. Phys. Lett. 68 (15), Apr. 8, 1996, 1996 American Institute of Physics, pp. 2052–2054.

"Extending the Travel Range of Analog–Tuned Electrostatic Actuators" by Elmer S. Hung et al., Journal of Microelectromechanical Systems, vol. 8, No. 4, Dec. 1999, pp. 497–505.

Hecht, Eugene, "Optics: Second Edition," Addison–Wesley Publishing Company, Reading Massachusetts, (1987), p. 163.*

* cited by examiner

Primary Examiner—Evelyn A. Lester
(74) Attorney, Agent, or Firm—Samuels, Gauthier & Stevens, LLP

(57) ABSTRACT

A micro-opto-electro-mechanical systems (MOEMS) modulator based on the phenomenon of frustrated total internal reflection (FTIR). The modulator effects amplitude and phase modulation at the boundary of a waveguide. Wavelength-specific switching is achieved by spatially separating the wavelength channels by dispersing a broadband input signal into its wavelength components through a grating. In exemplary embodiments, an array of microfabricated actuators is used to switch or modulate wavelengths individually. Applications include wavelength and space-resolved phase and amplitude modulation of optical beams, and re-configurable add/drop switching of dense wavelength-division multiplexed (DWDM) optical communication signals.

12 Claims, 8 Drawing Sheets

FRUSTRATED TOTAL INTERNAL REFLECTION-BASED MICRO-OPTO-ELECTRO-MECHANICAL MODULATOR/DEMODULATOR

BACKGROUND OF THE INVENTION

The present invention relates to micro-opto-electro-mechanical systems (MOEMS) and optical modulation. More particularly, the invention relates to the switching and amplitude and phase modulation of signals in optical communications networks such as wavelength-division multiplexing (WDM) architectures.

Over the past 10 years, micro-electro-mechanical systems (MEMS) have emerged as a key enabling technology in several applications. MEMS-based devices used in the automotive industry (accelerometers and pressure sensors) have demonstrated the commercial viability of micro-machining technology, and intense research efforts in fields such as biology, chemistry, and power conversion attest to the exciting possibilities in the new regimes afforded by miniaturization. Optical MEMS, or MOEMS refers to the particular class of MEMS devices that are intended for applications involving the manipulation and use of light. The principal benefits of MEMS devices in the optical domain are parallelism, compactness, low power consumption, and low cost.

Parallelism refers to the ability of simultaneously controlling (modulating) spatially resolved portions of the optical wavefront individually. Compactness is achieved by miniaturizing the mechanical actuators that accomplish light modulation, a possibility that is uniquely offered by MEMS technologies. Low power consumption and compactness go hand-in-hand because miniaturized actuators can be driven with modest power expenditure. Finally, low cost results from the mass-production of micro-fabricated devices using standard semiconductor fabrication materials and manufacturing techniques.

Due to the benefits enumerated above, there is keen interest in the application of MOEMS to the arena of optical switching, in particular in fiber optic networks. The physical modulation of the data in an optical beam can be done in a number of ways. Currently, the dominant method that attracts most interest from researchers and product developers alike is dense wavelength-division multiplexing (DWDM). DWDM is the superposition of several data channels (40–100) in the same fiber, each channel being carried by a different wavelength. In DWDM, adjacent channels are separated by 0.8 nm in the range of 1530–1565 nm.

In a DWDM network, special devices are needed to modulate the data into different channels, as well as access the modulated data in various conditions, e.g., in order to return specific channels to customers, perform network management functions, etc. A key device for any optical network is a switch. Fundamentally, a switch is a two-port, two-state device: in one state, light is allowed to propagate between one port (the input) and the second port (the output); in the other state, the light path between the two ports is blocked. An Add/Drop switch has more specific functionality in that it manipulates several optical channels in parallel. The "Drop" operation selects and extracts a single wavelength from the DWDM signal. The "Add" operation re-inserts a new data-stream in the DWDM signal, usually at the wavelength extracted by the "Drop" operation. Existing commercial Add/Drop switches are fixed, in the sense that the wavelength where data gets dropped or added is set at the time of fabrication. On the other hand, a re-configurable Add/Drop switch would be capable of adding and dropping data at arbitrary wavelengths (within the DWDM range) at any given time; the specific add/drop wavelength would be determined by the operator or by the network management software. The need for re-configurable optical Add-Drop switches is widely acknowledged in the communications industry, because such a device would allow operators of optical fiber networks to reassign leasing and usage attributes with minimum cost and time delay. However, commercial re-configurable Add/Drop switches do not currently exist.

State-of-the art switching devices belong to one of two major categories. One class is called optical-electrical-optical (OEO). In this scheme, the optical signal is transduced into an electrical signal, the signal is switched electrically, and then is reconverted back into a new optical beam. This opto-electrical/electro-optical conversion procedure is limited by the processing speed of the electronics that are available and is costly (each switching station needs demodulators, modulators and electronic equipment).

In the second approach, known as all-optical switching, switching is done entirely in the optical domain. Therefore, many of the problems with the OEO approach are eliminated. Furthermore, this approach is transparent to the protocol being used, the bit rate, or the type of information being sent. All-optical switching can be done with many different technologies, but MOEMS is a major contender for compact, low-cost implementation. Broadly speaking, current MOEMS efforts at optical switches can be characterized either as guided-wave, or as free-space.

Guided-wave switches consist of intersecting rows and columns of waveguides with some sort of switching mechanism at each cross-point. Cross-point switching techniques include pop-up mirrors and thermally actuated bubbles. Typical switching times for these approaches are on the order of 10 milliseconds. Moreover, in each of these approaches the quality of the optical beam is degraded by the switching element. The pop-up mirrors typically have surface quality worse than $\lambda/5$ due to the fabrication process which results in poor reflectivity and high losses. Furthermore, using bubbles as switching elements can introduce lensing effects. Losses in the waveguide material are also unavoidable. Polycrystalline silicon, commonly used as a waveguide material for micro-fabricated devices, can have losses up to 75 dB/cm. While CMOS-quality, single-crystal silicon has an absorption coefficient below $10^{-4}$ cm$^{-1}$ for 1.3 to 1.55 $\mu$m light, formation into waveguide structures using micro-fabrication techniques has yet to be demonstrated. Overall, the losses and optical beam degradation limit the ability to scale up the total port count of these switching elements.

The general architecture of a free-space switch, known as a router, consists of two arrays of mirrors that direct the beam from any channel in an input bank to any channel in the output bank. Clearly, these switches require highly smooth and reflective surfaces to act as mirrors, and in addition, the curvature of the surfaces needs to be carefully controlled. However, these are all highly non-negligible fabrication challenges, and contribute strongly to total insertion loss. Free-space propagation also imposes stringent requirements on the pointing accuracy and precision, and, hence, on the design and performance of the mirror actuators.

The present invention discloses a method for accomplishing general amplitude and phase modulation, and in particular switching in re-configurable Add/Drop switches for optical communications, in a fashion that addresses several of the above-mentioned problems. The principal features of the disclosed approach include low loss of optical power (estimated to be less than 0.1 dB per switched beam), minimal distortion of the switched optical wavefronts, compactness, mass manufacturability (potentially with low costs), and adaptivity to several functionalities.

SUMMARY OF THE INVENTION

A micro-opto-electro-mechanical modulator that can amplitude and phase modulate an optical beam. Utilizing frustrated total internal reflection and grating dispersion, the discrete wavelength components of a broadband optical beam can be individually manipulated.

The invention includes an optical substrate and an actuator module. A broadband input optical beam is introduced into the optical substrate such that total internal reflection traps the optical beam in the optical substrate, but allows the beam to leave the optical substrate only at the exit location.

A diffractive element is appropriately located on the optical substrate so as to effect dispersion of the broadband input optical beam into its component wavelengths. This diffractive optical element, which disperses the individual wavelength components to different angles of propagation, is an appropriately located transmission or reflection grating. The input angle and grating periodicity is prescribed such that upon incidence on the top and bottom surfaces of the optical substrate, beams of all input wavelengths are totally internally reflected at the interfaces and remain trapped inside the optical substrate.

The actuator module consists of an array of electrostatically-actuated cantilevers or pneumatically-actuated membranes, hereafter referred to as actuators, and is bonded to the top surface of the optical substrate. The actuators are fabricated on or from, and then recessed from, the top surface of the actuator module. Thus, when the actuator module is subsequently aligned and bonded to the optical substrate, the actuators are free to move in the space between the substrate and actuator surfaces. The alignment is such that each actuator in the actuator array is positioned at the location of a distinct wavelength among those separated from the input beam by the diffractive element.

In an exemplary embodiment, each actuator has two equilibrium positions, one making contact with the optical substrate surface and one remote. Here, contact means that the effective distance between the actuator surface and the optical substrate surface is 1% or less of the optical wavelength, e.g., if the mean wavelength of the input beam is $\lambda=1.55$ $\mu$m, contact is effected when the cantilever is within 15 nm from the optical wafer. When the actuator is brought into contact with the optical substrate, the total internal reflection of the corresponding wavelength is completely frustrated, changing the optical path.

By appropriate actuation it is also possible to stabilize the actuators at arbitrary intermediate locations within the free space between the optical substrate and actuator module surfaces. Partial frustration is then accomplished by moving the actuator to intermediate positions between the optical substrate and actuator module surfaces.

An advantage of the invention is that switching and modulation based on frustrated total internal reflection are minimally destructive for the switched beam. In the case where the optical substrate is a silicon wafer, the surfaces are not processed and hence maintain the optical quality of the as-manufactured polished silicon wafer surface. Moreover, the optical path is restricted to silicon alone, which enjoys a low absorption coefficient, as mentioned earlier. These two features ensure maximum efficiency in terms of transmission of optical power and preservation of the integrity of the optical wavefront.

Other advantages of the disclosed invention include: a) robust device architecture and actuation in the sense that the invention is impervious to structural misalignment due to thermal gradients; b) immunity to particulate, fluidic, and other environmental contamination as the cavity where the actuators are moving can be hermetically sealed (potentially at vacuum); c) scalability, reliability, high yield, and ultimately low cost as the fabrication of the device is based on existing micro-machining technology and techniques; and d) low power consumption, since the actuators have low mass and can be designed with high compliance.

A first exemplary embodiment of the invention is a generic amplitude and phase modulator for optical beams. It can be used for conditioning of optical beams, phase correction, and adaptive optics. A second exemplary embodiment is a re-configurable Add/Drop switch for DWDM signals. Design parameters and performance characteristics of these devices are given, and additional technical advantages are readily apparent to those skilled in the art from the figures, descriptions, and claims below.

DETAILED DESCRIPTION OF THE INVENTION

Figure 1:
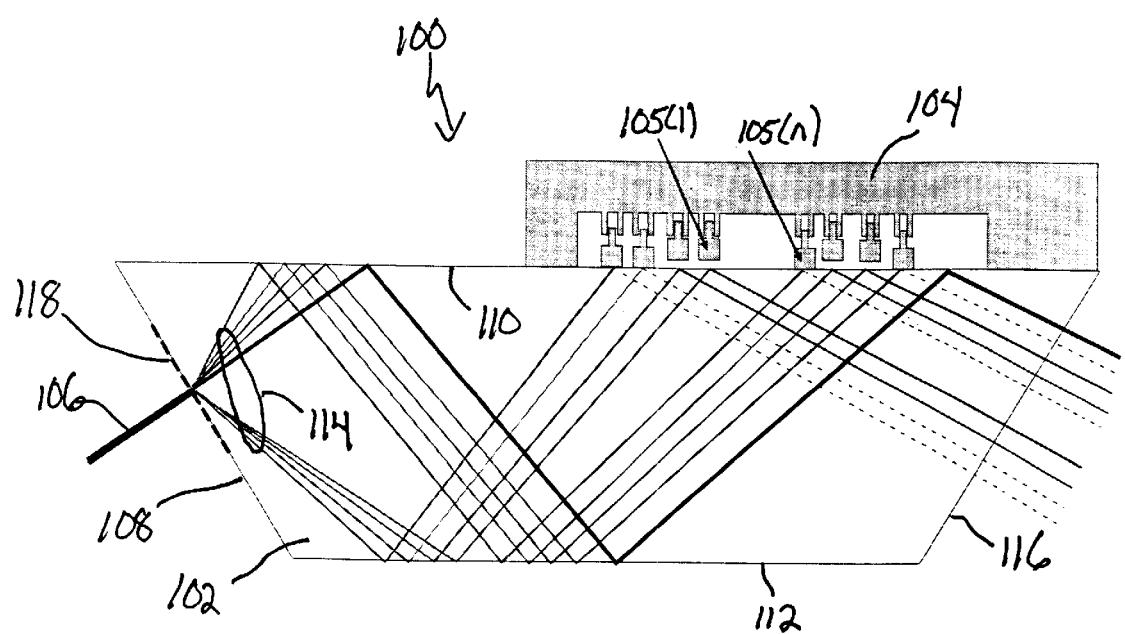
FIG. 1 is a cross sectional view of a schematic diagram of an exemplary modulator architecture with a transmission grating.

FIG. 1 is a cross sectional view of a schematic diagram of an exemplary embodiment of a variable optical modulator 100 according to the invention. As shown in FIG. 1, the modulator includes an optical substrate 102 and actuator module 104, with actuator elements 105(1)–105(n), that have been bonded together.

An input optical beam 106 is introduced into the input face 108 of the optical substrate 102 in a prescribed manner such that the conditions for total internal reflection, $$n_{substrate} \sin \theta_{incidence} > n_{surrounding},$$

are satisfied for all wavelength components of the input optical beam 106, where $n_{substrate}$ is the refractive index of the optical substrate, $n_{surrounding}$ is the refractive index of the surrounding medium (typically air, n=1, or silicon dioxide, n=1.5), and $\Gamma_{incidence}$ is the angle of incidence of the beam with respect the normal to the optical substrate top surface 110 and bottom surfaces 112. Thus, the optical beams 114 are trapped within the optical substrate 102, and propagate to the output face 116 where they finally exit the optical substrate. In an exemplary embodiment, the input optical beam 106 is broadband and is dispersed into its individual wavelength components 114 when it passes through a transmission grating 118 at the input face 108 of the optical substrate.

Figure 2:
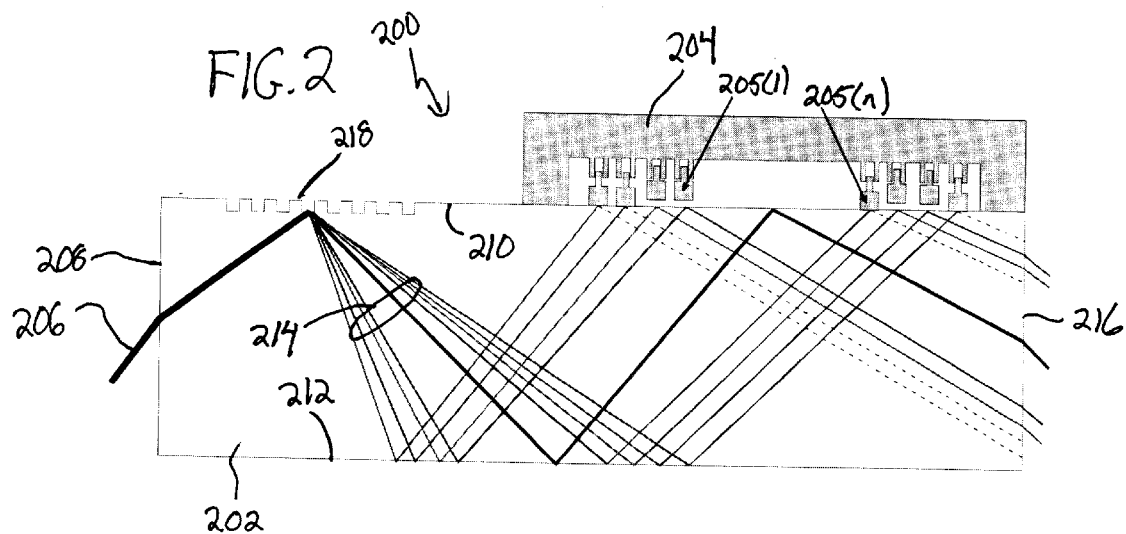
FIG. 2 is a cross sectional view of a schematic diagram of an exemplary modulator architecture with a reflect ion grating.

Alternatively, as shown in FIG. 2, the wavelength dispersion can also be effected with a reflection grating 218 at the appropriate location on the top surface 210 or the bottom surface 212 of the optical substrate 202. FIG. 2 is a cross sectional view of a schematic diagram of a modulator 200. As is well known, when a beam of light is incident on a transmission or reflection grating, the angle of propagation, α, is a function of the wavelength of light λ, and the periodicity of the grating, Λ. The sinusoidal nature of light gives rise to periodic constructive conditions, and thus there can be multiple intensity maxima. These are called the diffracted orders, and are integrally indexed as shown in the equation below:

$$\sin \alpha_m = \frac{m\lambda}{\Lambda} \quad (m = 0, \pm 1, \pm 2, \ldots).$$

For non-normal incidence, the angles of the higher orders are relative to the angle of propagation of the $0^{th}$ order, i.e., the directly reflected or transmitted beam. For certain prescribed conditions, the higher diffracted orders will not be present, as the sine function has a maximum value of one. Note that the propagation angle of the diffracted beam depends on the wavelength. Therefore, the grating disperses the input beam, i.e., it spatially separates individual wavelength components, as is common knowledge for those skilled in the art. The optical beam 206 in the invention is introduced such that once spatially separated, only the +1 diffracted order, $0^{th}$ diffracted order, and −1 diffracted order are present.

The physical implementation of the grating in the invention is by lithographic etching of the silicon surface 210 of FIG. 2. In yet another exemplary embodiment, the grating is recorded optically by interfering mutually coherent beams on photosensitive film. After exposure and fixing, the film is attached to the surface 108 of FIG. 1. The design and fabrication of the grating in all exemplary embodiments follow procedures well known in the art.

Due to the inherently highly efficient nature of total internal reflection (~100%), the dominant losses involved in this optical path are bulk absorption by the optical substrate material, and surface losses when the optical beam is introduced, and the output beam is extracted, from the optical substrate. Thus, the optical substrate should be of a material that has low absorption in the wavelength of interest. These materials include, but are not limited to, for example, single-crystal, CMOS-quality silicon wafers that have an absorption coefficient on the order of $10^{-4}$ cm$^{-1}$ for 1.33 to 1.55 µm light. This absorption coefficient corresponds to a 0.09 dB/m loss. Furthermore, the highly-polished, mirror-like surfaces of the wafers have an rms surface roughness of less than one nanometer, which minimize any total internal reflection losses at the top surface and bottom surface of the optical substrate. To further minimize the reflection losses, the input face and output face can, for example, be lapped and polished at an angle, since the reflection and transmission coefficients at material interfaces is a function of the incident angle. In this manner, the input beam and output beams can arrive and leave normal relative to the input face and output face.

In an exemplary embodiment, the actuator module 104, 204 include an array of actuator elements 105, 205 that are fabricated in a recess at the intersection of the top surface 110, 210 and the actuator module 104, 204, as shown schematically in FIGS. 1 and 2. The actuator elements are recessed a nominal distance from the top surface such that when the actuator module is bonded to the optical substrate, there is a finite gap between the actuator surfaces and the optical substrate top surface. The bonding of the actuator module and optical substrate is aligned such that each individual actuator element is spatially coincident with only one dispersed wavelength at the optical substrate top surface. As known to those skilled in the art, aligned wafer bonding with 5 µm tolerances is easily accomplished. Thus, when energized, each actuator element can make contact with the optical substrate top surface, and the corresponding individual optical beam can be selectively frustrated, and thus modulated.

Figure 3:
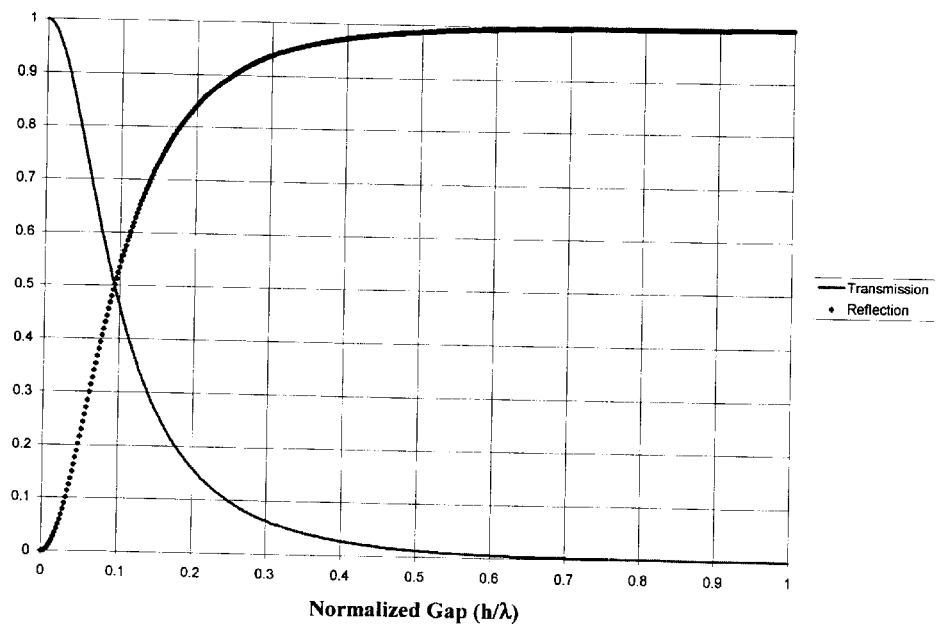
FIG. 3 is a graph showing the reflected and transmitted power as a function of the normalized gap separation for a TE mode optical beam incident at 20°.

The modulation effected by the position of the actuator module can be calculated as shown in the graph of FIG. 3 for a silicon-air-silicon system. The transmitted and reflected powers are plotted as a function of the gap separation for a 20° incident angle ($n_{silicon}$=3.42, $n_{air}$=1). As expected, when the gap separation is large enough, the transmitted power falls to zero, and the incident beam is totally internally reflected. However, as the gap is decreased, the evanescent waves starts coupling to the actuator module, and when the separation is on the order of a hundredth of a wavelength, the total internal reflection is essentially completely frustrated.

Figure 4:
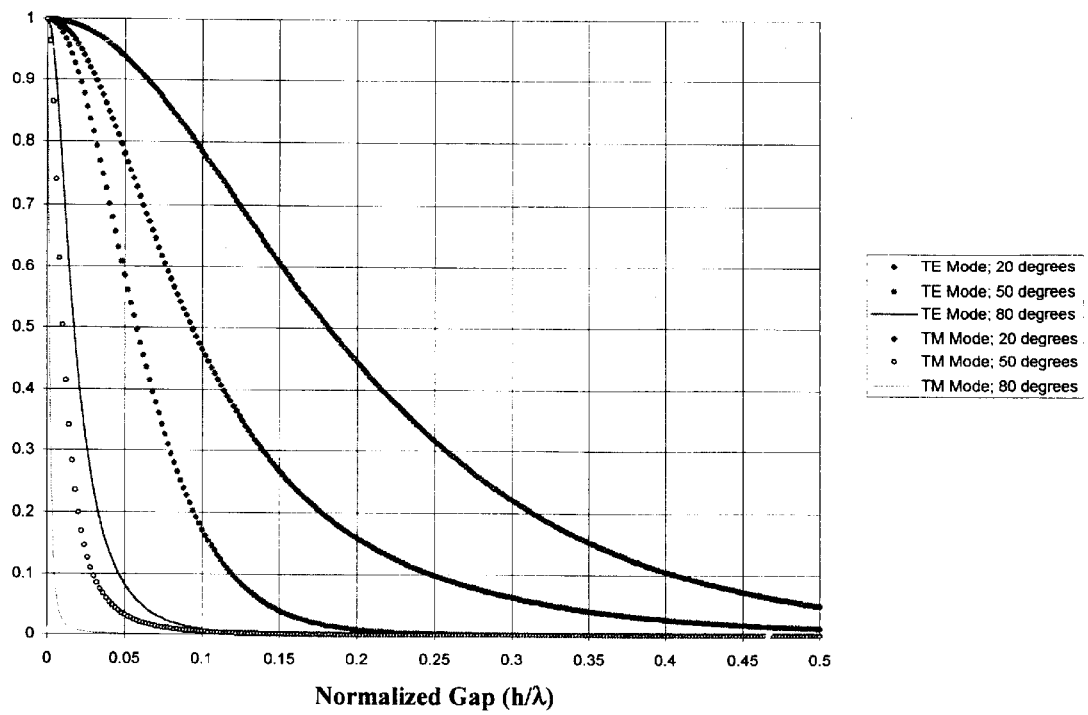
FIG. 4 is a graph showing the reflected and transmitted power as a function of the normalized gap separation for TE mode and TM mode optical beams incident at 20°, 50°, and 80°.

The model also predicts polarization and angular dependencies for the reflected and transmitted power. FIG. 4 is a graph showing the calculated transmitted power as a function of the gap, for both polarizations at several incident angles. In general, as the angle of incidence increases, the curves become steeper. Furthermore, for an incident angle of 20 degrees, the transmitted power curve is steeper for the TE mode. However, as the angle of incidence increases, the trend reverses and now the TM modes have the steeper curves.

It should be noted that the basic description of frustrated total internal reflection is completely analogous to the quantum mechanical phenomenon of electron tunneling. The electric field corresponds to the electron wave function, and the transmitted power corresponds to the probability density. Thus, in the same manner that an electron can tunnel through a potential barrier, photons can do the same across a small enough spatial gap.

Figure 5:
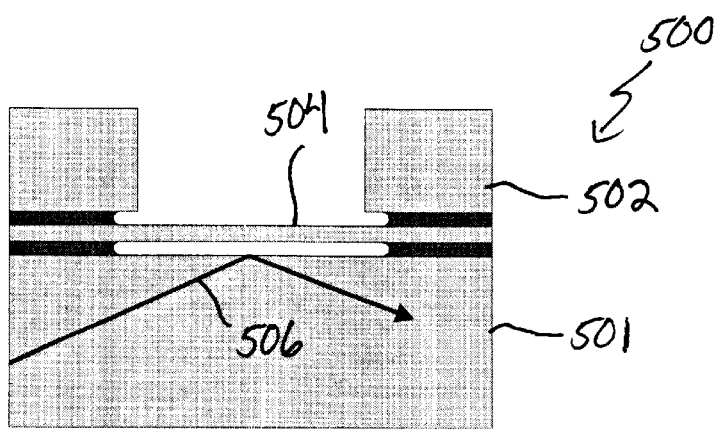
FIG. 5 is a cross sectional view of a schematic diagram of an exemplary pneumatically-actuated circular membrane actuator in the "off" state.
Figure 6:
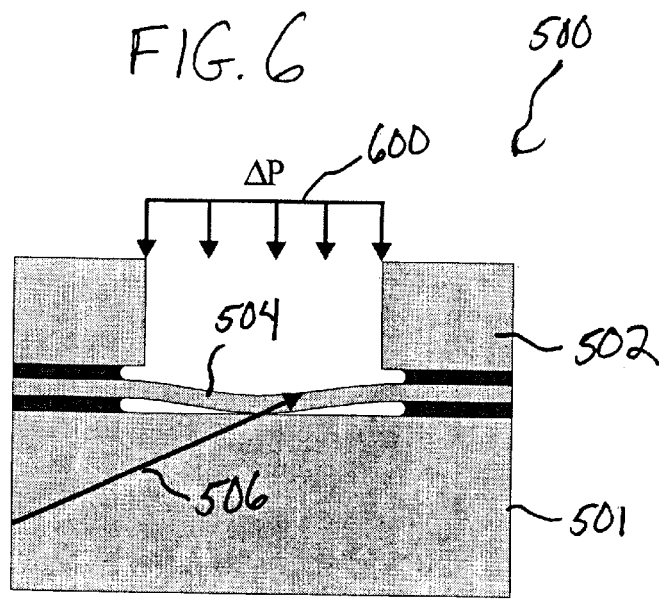
FIG. 6 is a cross sectional view of a schematic diagram of an exemplary pneumatically-actuated circular membrane actuator in the "on" state.

In one exemplary embodiment of the present invention, the actuator design for effecting the frustrated total internal reflection is to use a pneumatically actuated circular membrane. FIGS. 5 and 6 are cross sectional views of schematic diagrams of a pneumatically-actuated circular membrane actuator 500 in the "off" and "on" states, respectively.

To fabricate such an actuator 500, a silicon-on-insulator (SOI) wafer 502 is oxidized, and the resulting silicon dioxide is patterned on the device side to recess the original device silicon layer. After aligned wafer bonding to the optical substrate wafer 501, the substrate layer of the SOI is patterned and etched using Deep Reactive Ion Etching (DRIE). A final HF-based, buffered oxide etch (BOE) of the buried oxide layer of the SOI releases the silicon membrane 504. When positive pressure 600 is applied, the membrane 504 is deflected towards the optical substrate surface, and the totally internally reflected beam 506 is frustrated.

The maximum deflection of the membrane 504 is at the center, and is governed by, $$\eta_{max} = \frac{Pr_o^4}{64D},$$

where $\eta_{max}$ is the maximum deflection, P is the applied gauge pressure, $r_o$ is the radius of the membrane, and D is the flexural rigidity of the membrane which is a function of the membrane thickness, Young's modulus, and Poisson's ratio.

Clearly, by varying the pressure applied, the maximum deflection of the beam can be controlled, and correspondingly the gap separation between the beam surface and optical substrate top surface. As previously described and shown in FIG. 3, the gap separation determines the amount of frustrated total internal reflection that is effected on the optical beam at the particular actuator location. Thus, in the preferred variable optical modulator embodiment, the amplitude and phase of the optical beam that arrives at the output can be modulated from completely transmitted and unaffected, to completely blocked, and to any state in between by continuously varying the position of the membrane surface.

Figure 7:
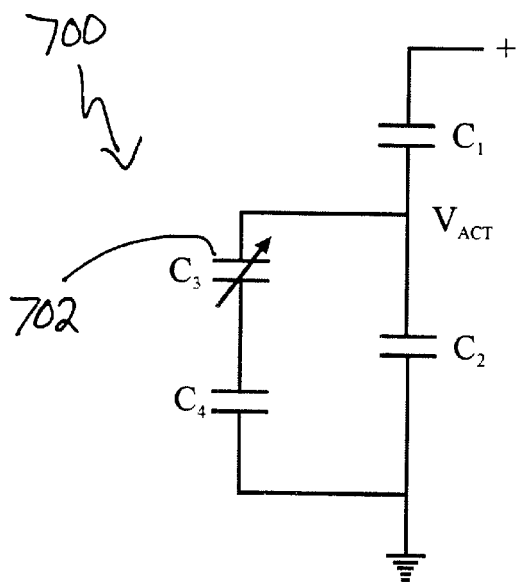
FIG. 7 is the equivalent electrical circuit for electrostatic actuation of the circular membrane actuator.

Alternatively, FIG. 7 is an equivalent electrical circuit model 700 for electrostatic actuation of a circular membrane actuator. The optical substrate is grounded, and the variable capacitor 702 formed between the optical substrate and the membrane can be driven electrostatically. Application of a voltage across the device from the back surface of the actuator module then causes a potential to develop across this capacitor, effecting a capacitive divider. The resulting electrostatic attraction causes the membrane to deflect down towards the optical substrate. When the electrostatic bias is removed, the compliance in the membrane acts to restore the membrane back to its original position.

Figure 8:
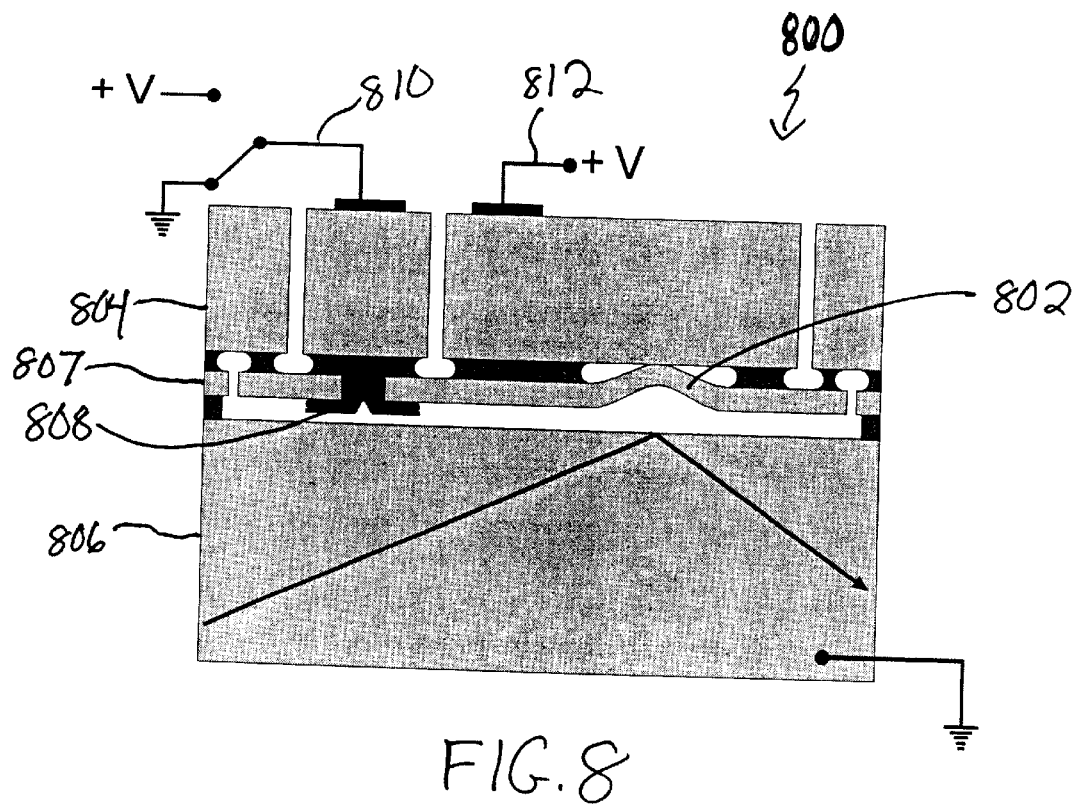
FIG. 8 is a cross sectional view of a schematic diagram of an exemplary electrostatically-actuated beam actuator in the "off" state.
Figure 9:
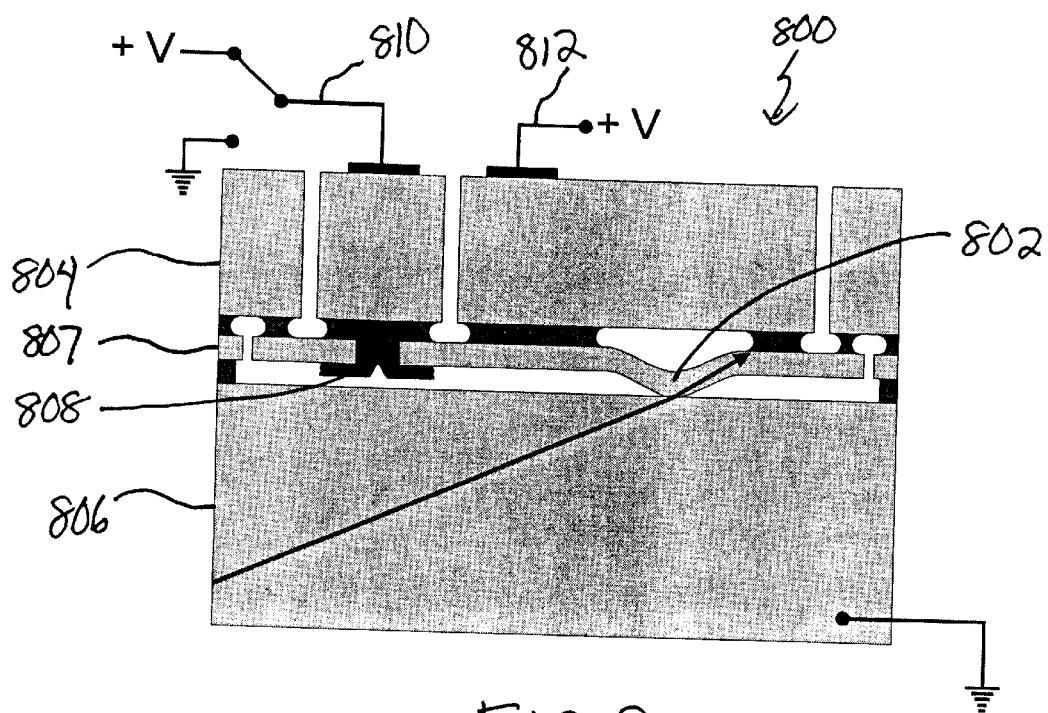
FIG. 9 is a cross sectional view of a schematic diagram of an exemplary electrostatically-actuated beam actuator in the "on" state.

Another exemplary embodiment of the invention includes an optical add/drop modulator. The actuator design for effecting the frustrated total internal reflection can be, but is not limited to, a purely electrostatically actuated mechanical beam 802 within an actuator module 800. FIGS. 8 and 9 are schematic diagrams of an electrostatically-actuated beam actuator module 800 in which the mechanical beam is in the "off" position and "on" position, respectively. An SOI wafer is used to fabricate the actuator module 800. An electrical connection between the SOI device silicon layer 807 and substrate silicon layer 804, is formed by fabricating a doped poly-silicon plug 808.

As is clear to those skilled in the art, an initial etch through the device silicon to the buried oxide is then followed by a short oxidation. This oxide is then patterned and etched with BOE so that the substrate silicon is now exposed. Poly-silicon is then deposited and doped, and the thermally grown oxide layer is used as an etch stop to create the poly-silicon plug. Another etch of the SOI device silicon layer 807 electrically isolates each beam. A recess on the optical substrate 806 can be formed by, but is not limited to, a patterned oxidation step. The optical substrate and actuator module are then aligned wafer-bonded. Subsequently, a DRIE of the SOI substrate layer from the backside defines the switching electrode 810 and backside electrode 812.

The optical substrate 806 is again electrically grounded, and the backside electrode 812 is biased to a set potential. When the switching electrode 810 is set to ground, the mechanical beam 802 is also grounded by virtue of the electrical connection provided by the doped poly-silicon plug 808. As a result, there is a potential difference developed between the mechanical beam 802 and the backside electrode 812. This electrostatic potential creates an attractive force that causes the mechanical beam to deflect upwards, closing the upper gap. When the switching electrode is set to the same potential as the backside electrode, the potential difference between the mechanical beam and backside electrode is removed, and instead a potential difference is developed between the mechanical beam and the optical substrate. As a result, the mechanical beam is deflected downwards towards the optical substrate and closes the lower gap. As a result, the appropriately located optical beam component is frustrated as shown in FIG. 9.

The electrostatic deflection of the beam has an instability called the "pull-in effect" which is well known to those skilled in the art. The source of the instability is that to first order, the mechanical compliance of the beam is linear with displacement, while the electrostatic force is nonlinear, and given by:

$$F_{electrostatic} = \frac{\varepsilon_0 A V^2}{2(z_0 - z)^2},$$

where $\epsilon_o$ is the permittivity of free space, A is the area of the object perpendicular to the motion, V is the applied voltage, z is the coordinate of motion, and $z_o$ is the gap separation for no applied voltage. As a result of the non-linearity, stable force balance and deflection can only be achieved for one third of the original gap distance. Beyond this distance, the stability of the displacement is lost, and the gap is sharply closed with no further increase in the applied voltage.

In the OADM embodiment, this effect is utilized to completely establish intimate contact between the actuator surface and optical substrate top surface. Thus, the separation is limited by the surface roughness of the surfaces, which as previously mentioned is on the order of one nanometer. At WDM frequencies (1.33–1.55 μm) the frustration effected by this separation is essentially 100%.

Figure 10:
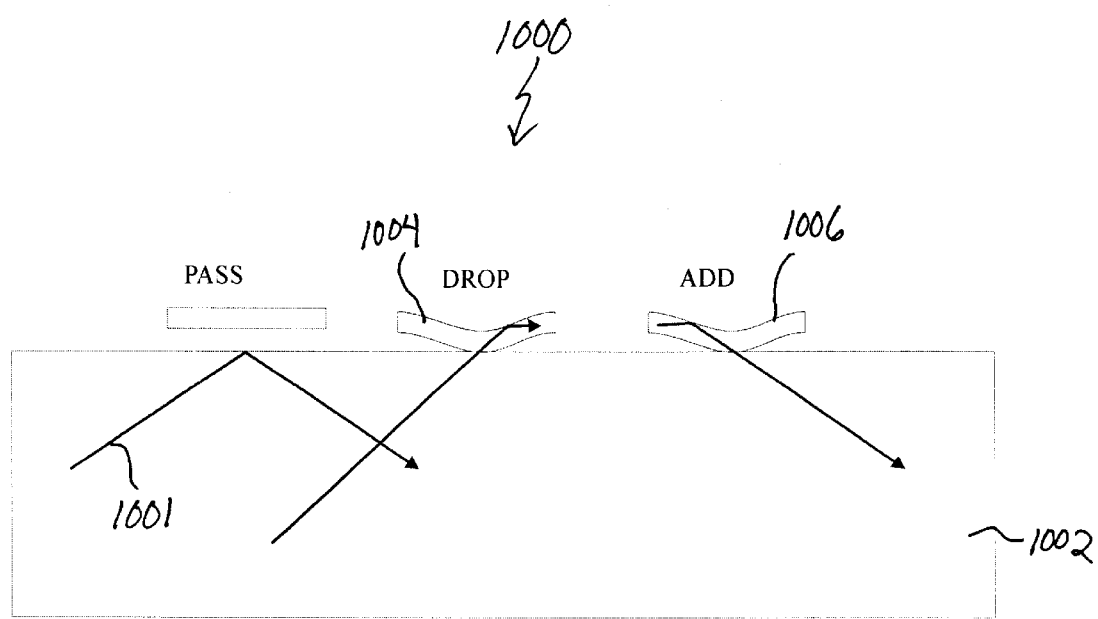
FIG. 10 is a cross sectional view of a schematic diagram of the pass and drop channels of an exemplary optical add/drop modulator.

Thus, in the exemplary embodiment, the frustrated beam can be coupled out, or in, through the actuator, as shown in FIG. 10. FIG. 10 is a cross sectional view of a schematic diagram of the pass, drop and add channels of an exemplary embodiment of an OADM 1000 in accordance with the invention. When the pass beam 1001 is to be dropped, a mechanical beam actuator 1004 is energized and deflected to the top surface of the optical substrate 1002. With an appropriate geometry, the optical beam is then trapped within the actuator 1004 and coupled out. Similarly, the "add" channel can be effected in an analogous manner with actuator 1006.

Figure 11:
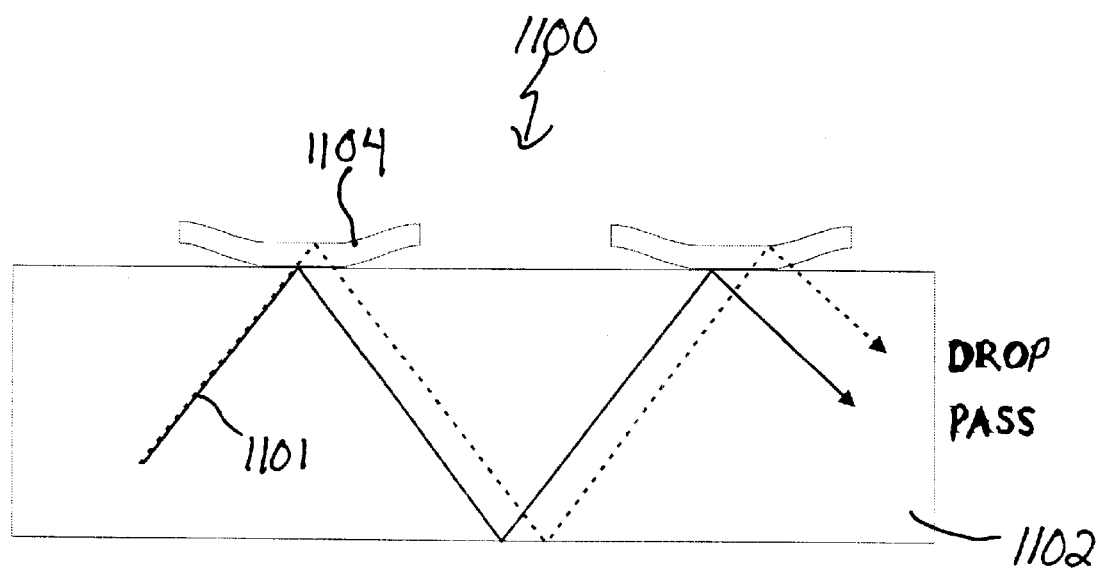
FIG. 11 is a cross sectional view of a schematic diagram of an exemplary displacement effected OADM drop channel.

FIG. 11 is a cross sectional view of a schematic diagram of displacement effected in an OADM 1100 drop channel. The pass channel is dropped when the mechanical beam of actuator element 1104 is lowered as the extra path length effects a displacement of the optical beam 1101 at the optical substrate 1102 bottom surface. If necessary, multiple mechanical beams can be fabricated and actuated to effect greater separation between the pass and drop channels.

Figure 12:
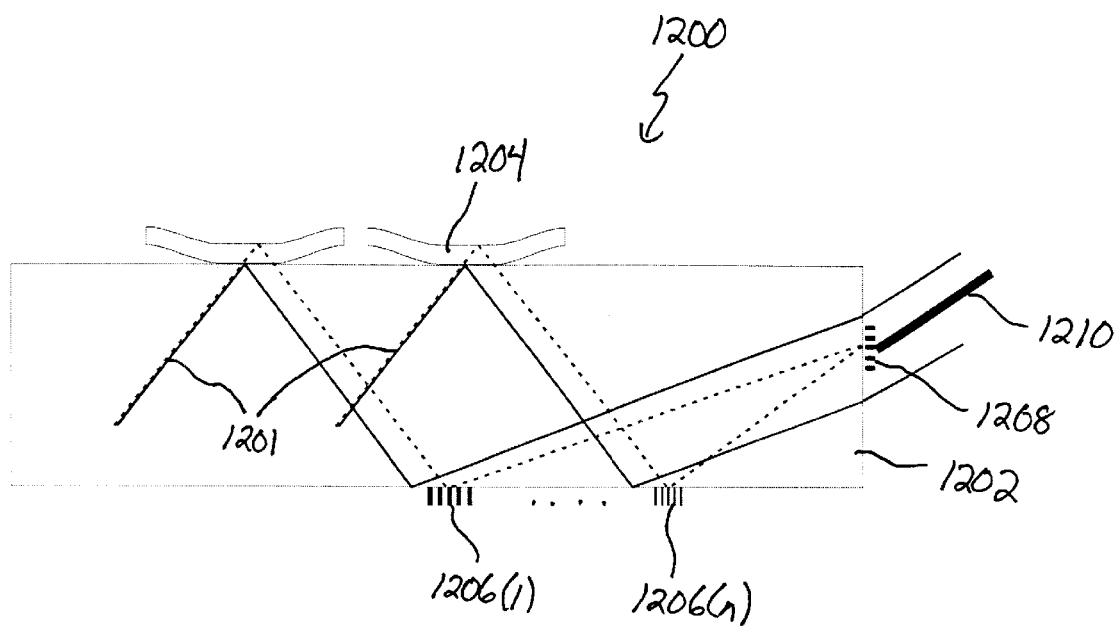
FIG. 12 is a cross sectional of a schematic diagram of an exemplary grating effected OADM add channel.

In this embodiment of the OADM, recombination of the add channel can be accomplished, again via grating dispersion as shown in FIG. 12. FIG. 12 is a cross sectional view of a schematic diagram of a grating effected OADM 1200 add channel. Various single wavelength beams propagate in the optical substrate 1202. Gratings 1206(1)–1206(n) of suitable periodicity are then placed at appropriate locations on the optical substrate such that the dispersion effected directs each beam to the output, when a corresponding actuator element 1204 is lowered. A final grating 1208 at an output region acts to recombine the wavelengths into an aggregate WDM output signal 1210.

It should be noted that in the variable optical modulator embodiment, electrostatic control over the entire gap distance is required. To effect complete control, alternate electrostatic actuation architectures can be utilized. To balance the nonlinear nature of the capacitive attraction force, a matched variable capacitor can be added in series with the electrostatic actuator, or alternative leveraged bending structures can be used to create non-linear restoring forces.

Although specific embodiments of the present invention have been described, it is to be understood that numerous modifications, variations, transformations, and alterations of the principles of the invention may be suggested to one skilled in the art. Accordingly, it is intended that the present invention encompass modifications, variations, transformations, and alterations that fall within the spirit and scope of the present invention.

What is claimed is:

1. A method of modulating light comprising:
   providing a light beam to an optical substrate at an input region;
   dispersing said light beam into distinct wavelengths within said optical substrate; and
   outputting selected ones of said distinct wavelengths propagating within said optical substrate with micro-electro-mechanical actuators positioned at a region of said substrate to interact with each of said distinct wavelengths.

2. The method of claim 1 further comprising providing dispersion grating to disperse said light beam.

3. The method of claim 1, wherein said substrate comprises a first silicon wafer.

4. The method of claim 3, wherein said micro-electro-mechanical actuators are provided on a second substrate.

5. The method of claim 4, wherein said second substrate comprises a second silicon wafer that is bonded to said first silicon wafer.

6. The method of claim 1, wherein said light beam comprises a wavelength-division multiplexed signal.

7. The method of claim 1, wherein said light beam comprises white light.

8. The method of claim 7, wherein said substrate comprises fused silica.

9. The method of claim 1 further comprising modulating said selected ones of said distinct wavelengths with a digital picture.

10. The method of claim 1, wherein said light is phase, amplitude and polarization modulated in both spectrum and space.

11. A light modulator comprising:
    an optical substrate having an input region for receiving a light beam;
    a light dispersing element which disperses said light beam into distinct wavelengths within said optical substrate; and
    micro-electro-mechanical actuators which output selected ones of said distinct wavelengths propagating within said optical substrate, said micro-electro-mechanical actuators positioned at a region of said substrate to interact with each of said distinct wavelengths.

12. A re-configurable add/drop switch for DWDM signals comprising:
    an optical substrate having an input region for receiving a light beam representative of DWDM signals;
    a light dispersing element which disperses said light beam into distinct wavelengths within said optical substrate; and
    micro-electro-mechanical actuators which output selected ones of said distinct wavelengths propagating within said optical substrate, said micro-electro-mechanical actuators positioned at a region of said substrate to interact with each of said distinct wavelengths.

* * * * *